United States Patent
Matoba

(10) Patent No.: US 8,184,313 B2
(45) Date of Patent: May 22, 2012

(54) APPARATUS, SYSTEM AND METHOD FOR PERFORMING ATTENDED OR UNATTENDED PRINTING

(75) Inventor: Tatsuo Matoba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1487 days.

(21) Appl. No.: 11/398,083

(22) Filed: Apr. 5, 2006

(65) Prior Publication Data
US 2006/0227373 A1 Oct. 12, 2006

(30) Foreign Application Priority Data
Apr. 12, 2005 (JP) ................................ 2005-114689

(51) Int. Cl.
*G06F 3/12* (2006.01)
(52) U.S. Cl. ............... 358/1.15; 358/1.12; 705/7.12; 705/7.23; 705/7.26; 700/99
(58) Field of Classification Search .......... 358/1.15; 705/7.12, 7.23, 7.26; 700/99
See application file for complete search history.

(56) References Cited

U.S. PATENT DOCUMENTS

| | | | |
|---|---|---|---|
| 5,144,419 A * | 9/1992 | Nakatsuka et al. | 358/534 |
| 6,456,397 B1 * | 9/2002 | Chase et al. | 358/3.26 |
| 7,196,809 B2 | 3/2007 | Ouchi | |
| 2001/0012096 A1 * | 8/2001 | Haraguchi et al. | 355/40 |
| 2002/0051192 A1 * | 5/2002 | Utsunomiya | 358/1.15 |
| 2002/0165754 A1 * | 11/2002 | Tang et al. | 705/9 |
| 2003/0025936 A1 * | 2/2003 | Ouchi et al. | 358/1.15 |
| 2003/0083917 A1 * | 5/2003 | Tracey et al. | 705/7 |
| 2005/0010809 A1 * | 1/2005 | Hayano | 713/200 |

FOREIGN PATENT DOCUMENTS

| | | |
|---|---|---|
| JP | 09-037084 A | 2/1997 |
| JP | 2002-063004 A | 2/2002 |
| JP | 2003-034061 A | 2/2003 |
| JP | 2003-114782 A | 4/2003 |
| JP | 2003-298805 A | 10/2003 |
| JP | 2003-323273 A | 11/2003 |
| JP | 2004-203858 A | 8/2004 |

* cited by examiner

*Primary Examiner* — King Poon
*Assistant Examiner* — David S Cammack
(74) *Attorney, Agent, or Firm* — Canon USA Inc IP Division

(57) ABSTRACT

In order to allow effective utilization of a printing device when operators are absent, such as nighttime and further effective utilization of the printing device in business hours that operators are present, when a received print order is determined to be processable outside predetermined hours, an attribute indicating processability outside the predetermined hours is set to the print order. Thus, the print order to which the attribute is set is allocated to the outside of the business hours when the print order cannot be scheduled to be processed inside the predetermined hours.

12 Claims, 14 Drawing Sheets

| | Items | Meaning (setting value) |
|---|---|---|
| General information on order | Service type | Output/bookbinding service |
| | | Poster/panel |
| | | copy service |
| | | Reorder |
| | | Stored document |
| | Order name | Optional character string |
| | Order ID | 32Byte unique character string |
| | Method of receiving | Received via network |
| | | Received via media |
| | Finishing method | 1 file→1 document |
| | | 2 or more files→1 document |
| | | 2 or more files→2 or more documents |
| File information | Upload file number | Received file number |
| | Upload file name | Optional character string |
| | File ID | 32 Byte unique character string |
| | Page number | Numerical value specified |
| | Os type | Oindows/Oacnintosh/Onix |
| | Original creation application | Oicrosoft Oord |
| | | Oicrosoft Oxcel |
| | | Others |
| | Application version | Optional character string |
| Print format | Finished size | B0, A0, B1, A1, , |
| | Direction of output sheet | Portrait |
| | | Landscape |
| | Bookbinding type | Case binding |
| | | Saddle stitch binding |
| | | Ring binding |
| | | Staple |
| | | Others (comments) |
| | Binding direction | Left (not specify width) |
| | | Right (not specify width) |
| | | Top (not specify width) |
| | | Others (comments) |
| | Print (body) | One-sided |
| | | Two-sided |
| | Color mode (body) | Monochrome |
| | | Color |
| | Sheet type (body) | Monochromatic standard paper |
| | | Colored standard paper |
| | | Thick form (thickness can be specified) |
| | | Glossy thick paper |
| | | Colored paper (color can be specified) |
| | | Monochromatic OHP film |
| | | Colored OHP film |
| | Punched holes | 2 holes, 3 holes, 4 holes, 6 holes, 30 holes, , |
| | Folding | Fold a sheet in two, fold a sheet in three, fold a sheet in X |
| | Cover | Cover is attached |
| | | Cover is not attached |
| | Print (cover) | Not print |
| | | One-sided |
| | | Two-sided |
| | Print (back cover) | Not print |
| | | One-sided |
| | | Two-sided |
| | Color mode (common to cover/back cover) | Monochrome |
| | | Color |

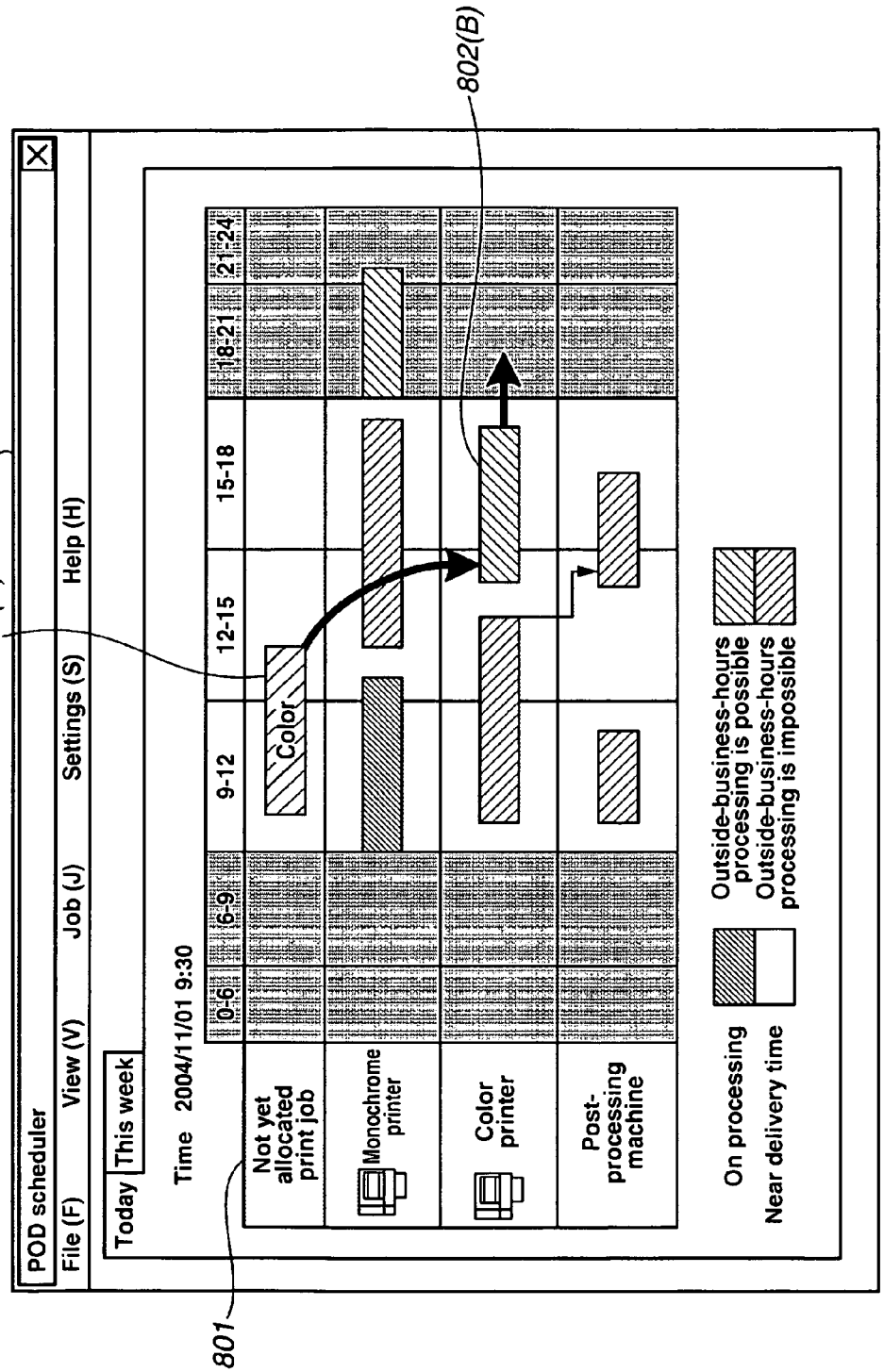

Outside-business-hours job allocation confirmation

Job cannot be allocated to during-business-hours operation.
Next job will be allocated to outside-business-hours operation.

| | |
|---:|:---|
| Job ID : | 0002 |
| Printer : | Color printer |
| Starting time : | 18 : 00 |
| Finishing schedule time : | 21 : 00 |
| Delivery time : | 2004/11/03 10 : 00 |
| Paper size : | A4 |
| Number of sheets : | 500 |

Detail view

Do you permit allocation?

OK    Cancel

APPARATUS, SYSTEM AND METHOD FOR PERFORMING ATTENDED OR UNATTENDED PRINTING

BACKGROUND OF THE INVENTION

1. Field of the Invention

The present invention relates to an image forming management apparatus, system, method and program. More specifically, the present invention relates to an image forming management apparatus, its system, a method of use of the same and a program which schedule a plurality of printing processes and realize efficient work production in a printing system in which a computer and a printing device are mutually connected through networks.

2. Description of the Related Art

Conventionally, commercial printing services have created a printed article in accordance with requests from clients (for example, personal users, corporations or the like) In business operations of such commercial printing services, printing data (original) are provided from clients, instructions such as a print format, number of sheets and a delivery time are received, and a printed article is created to be delivered to the clients. Such many printing services have used a large scale apparatus such as an offset plate making printing machine which is well-known to perform the business operations.

Further, recently, in accordance with a high speed and a high image quality of an electrophotographic printing device and an ink-jet printing device, business conditions of the commercial printing referred to as "copy service", "printing service", "Print On Demand (POD) center" or the like capable of outputting and delivering at a short time have also emerged.

Printing request to these printing services is performed by mailing an original which is recorded in paper or an electronic medium (FD (floppy disk), MO (magneto-optical disk), CD-ROM (compact disk-read-only memory), etc.) and a printing instruction sheet (order instruction sheet) in which the number of print sheets of an original, a bookbinding method, a delivery time or the like is described, or by directly bringing these in printing companies from users to services who provide the above-described service (receiving). A system is put to practical use which can order or receive an order of printing online through the Internet or an intranet. For example, users access a homepage (web page), fill necessary items such as purchaser information (receiving), print formats and the number of sheets in a form for printing request, and send the form with an original file, so that the printing of the original can be ordered. The printing service side receives the request from users and schedules printing process. Then, in accordance with a created schedule, the printing work and the bookbinding work are executed by a printer connected to a work computer. Thus, a created printed article is delivered to clients to complete the business operations.

In such printing services who perform printing processing requested from users, it is necessary to complete printing with a stable quality, so as to securely make a specified delivery time in time. Further, in a large scale printing center, it is necessary that a plurality of operators process many print requests (order) in parallel using various printing devices and work computers. Hence, it is required to efficiently utilize resources such as people (operator) and apparatuses as much as possible. To efficiently utilize the resources, a printing device scheduler is proposed in which an operator performs an operation on a screen, thereby, setting a printing work schedule in consideration of printing devices possessed in printing sites, priority of printing job, business hours in the printing sites and others to allow schedule management.

Further, a printing device scheduler is also disclosed in Japanese Patent Application Laid-Open No. 2002-63004 which has a function of displaying a dialog to allow an operator to confirm the allocation of a printing in a case where, when setting and change of a schedule are performed in the scheduler, the printing job is not completed during business hours and is put outside business hours. However, the above described conventional technique merely achieves the schedule in business hours that operators in the printing sites are in service and does not manage a print order which executes an unmanned automatic operation outside business hours such as nighttime and holidays in which operators are absent.

Furthermore, a printing control apparatus disclosed in Japanese Patent Application Laid-Open No. 2002-63004 can schedule a printing job to be executed outside business hours. However, it does not determine whether the job can execute an automatic unmanned operation or not. Thus, eventually, there is a possibility that operators stay after business hours and carry out the work. Accordingly, the printing schedule of an unmanned automatic operation cannot be achieved. Also, in the technique discussed in Japanese Patent Application Laid-Open No. 2002-63004, to prevent a job intrinsically required to be processed during business hours from being allocated to an outside-business-hours operation, a dialog is displayed and outside-business-hours scheduling is performed by obtaining approval of workers. Consequently, for example, when a plurality of printing jobs are scheduled to be performed outside business hours, workers need to determine whether scheduling is carried out or not for each job, one by one, to be performed outside business hours. Hence, there are some possibilities that the efficiency of the workers is reduced.

In addition, the technique described in Japanese Patent Application Laid-Open No. 2002-63004 does not disclose a counter measure when an error arises in a job scheduled to be executed outside business hours. Thus, when an error arises in printers or the like in a condition that workers are absent outside business hours, the error is left. Thus, the schedule after the next business day is possibly affected significantly.

SUMMARY OF THE INVENTION

In view of the above problems, according to the present invention, an attribute of a received print order is recognized, and attribute information indicating processability outside business hours is set in a print order satisfying a predetermined condition (for example, manual work of workers is not required or delivery time has some allowance). Thus, when outside-business-hours processing is required, a print order in which the attribute information indicating processability outside business hours is set is scheduled to be processed outside business hours, thereby enhancing work efficiency of workers.

Further, according to the present invention, when a processing error arises in a print order which is scheduled to be processed outside business hours, a set destination address is notified if the content of the error satisfies a predetermined condition (for example, in the case of also affecting the schedule of remaining orders which are scheduled to be processed outside business hours), thereby not affecting the schedule after the print order in which the error arises.

In at least one exemplary embodiment of the present invention, an information processing apparatus includes a storage unit configured to store print order information having image forming data and setting information, a determination unit configured to determine whether the print order information stored in the storage unit can be processed outside predetermined hours, a setting unit configured to set attribute information indicating processability outside the predetermined hours to the print order information if the print order information is determined by the determination unit to be processable outside the predetermined hours, and a scheduling unit configured to, if the print order information can not be allocated to a schedule inside the predetermined hours, allocate the print order information to which the attribute information is set by the setting unit to a schedule outside the predetermined hours.

According to another exemplary embodiment of the present invention, an information processing system is provided. It includes an information processing apparatus including a client terminal configured to issue print order information containing image forming data and setting information via a network, a storage unit configured to store the print order information, a determination unit configured to determine whether the print order information stored in the storage unit can be processed outside predetermined hours, a setting unit configured to set attribute information indicating processability outside the predetermined hours to the print order information when the print order information is determined by the determination unit to be processable outside the predetermined hours, and a scheduling unit configured to allocate the print order information to which the attribute information is set by the setting unit to a schedule outside the predetermined hours when the print order information cannot be allocated to an inside of the predetermined hours. The system also includes an image forming apparatus configured to receive the print order information via the network and to perform image forming in accordance with the print order information.

According to yet another exemplary embodiment of the present invention, an information processing method is provided which includes a storage step of storing print order information including image forming data and setting information in a storage unit; a determination step of determining whether the print order information stored in the storage unit can be processed outside predetermined hours; a setting step of setting attribute information indicating processability outside the predetermined hours to the print order information if the print order information is determined in the determination step to be processable outside the predetermined hours; and a scheduling step of, if the print order information can not be allocated to a schedule inside the predetermined hours, allocating the print order information to which the attribute information is set in the setting step to a schedule outside the predetermined hours.

And according to yet another exemplary embodiment of the present invention, a program executable by a computer for processing information is provided which includes a storage module of storing print order information including image forming data and setting information in a storage unit; a determination module for determining whether the print order information stored in the storage unit can be processed outside predetermined hours; a setting module for setting attribute information indicating processability outside the predetermined hours to the print order information if the print order information is determined in the determination module to be processable outside the predetermined hours; and a scheduling module for, if the print order information can not be allocated to a schedule inside the predetermined hours, allocating the print order information to which the attribute information is set in the setting module to a schedule outside the predetermined hours.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments, features and aspects of the invention and, together with the description, serve to explain the principles of the invention.

FIG. 7 is a diagram showing one example of contents stored in a job ticket according to an embodiment of the present invention.

FIG. 8 is a diagram showing one example of a device scheduler screen according to an embodiment of the present invention.

DETAILED DESCRIPTION OF THE EMBODIMENTS

Numerous, exemplary embodiments, features and aspects of the invention will be described in detail below with reference to the drawings.

First Exemplary Embodiment

Figure 1:
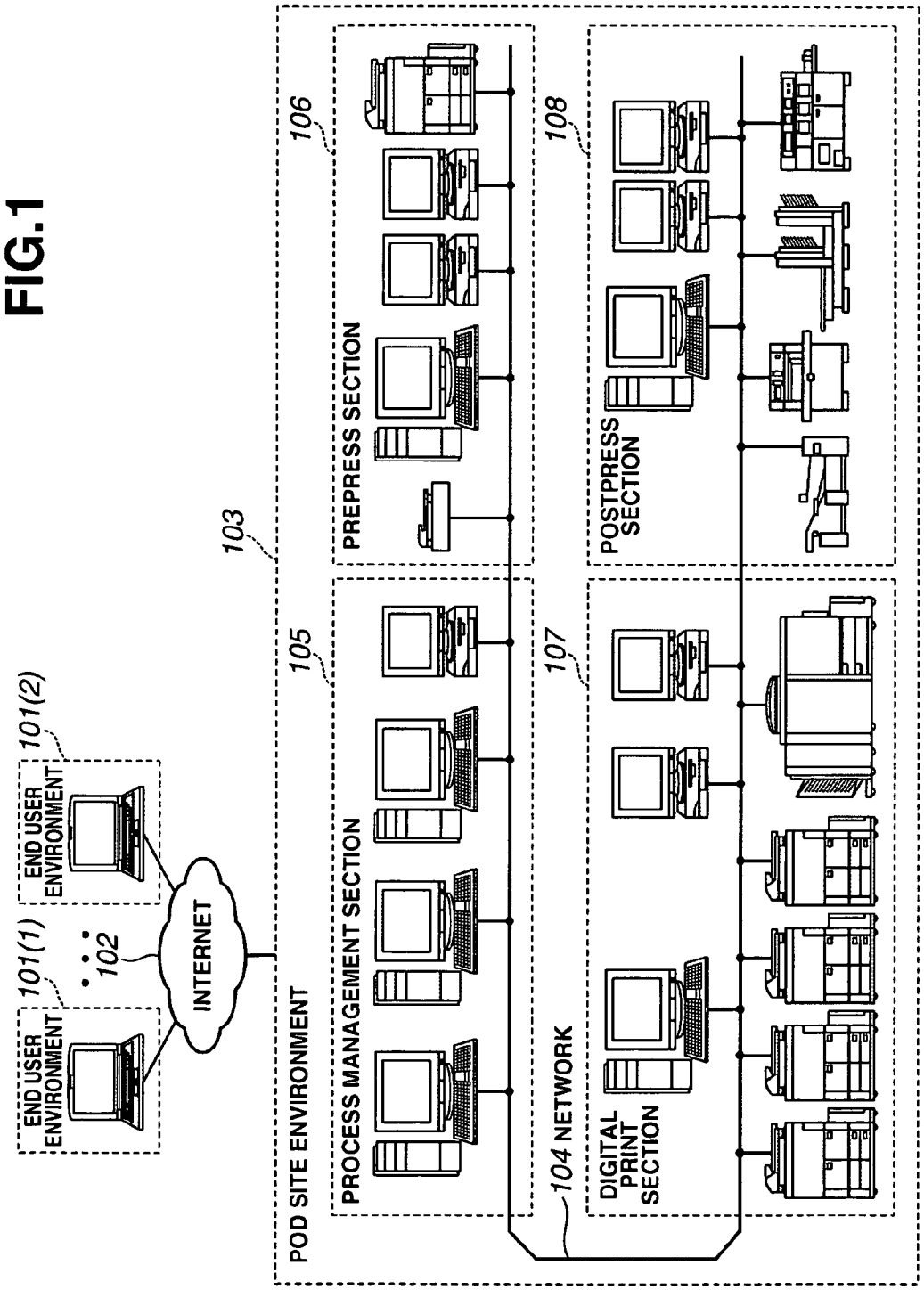
FIG. 1 is a block diagram showing one example of an overall configuration of an exemplary printing system according to an embodiment of the present invention.

FIG. 1 is a block diagram showing one example of the overall configuration of an exemplary printing system according to an embodiment of the present invention. It is noted that the printing system in the description below is provided for exemplary purposes and is not intended to be limiting.

As shown in FIG. 1, one or a plurality of end user environments 101(1) and 101(2), and a POD (Print On Demand) site environment 103 are connected through the Internet 102. The end user environments 101(1) and 101(2) indicate a network environment in which in the case of common users, a PC connected to the Internet at home, a client PC connected to an intranet in-house and used by end users, or the like is connected. Note that since each of the end user environments 101(1) and 101(2) has a similar configuration, in this embodiment, to simplify the description, when the specified end user in the end user environments 101(1) and 101(2) is designated, it is described as an end user environment 101(X). Also, when a plurality of the end user environments 101(1) and 101(2) are entirely designated, it is simply described as an end user environment 101.

In the end user environment 101, purchasers who make order request of printing are present, and can not only issue a print order using each client PC from each end user environment 101(X) but also confirm the status of the print order or the like.

In the present embodiment, the Internet 102 is described by exemplifying the Internet. However, it may be other network systems such as LAN (Local Area Network). Note that though it is omitted in this embodiment, the end user environment 101 and the POD site environment 103 are connected through the Internet 102. However, a center server or the like can also be included which is configured by a WEB server that separately provides a receiving screen to end users and a DB server that stores received orders.

On the other hand, the POD site environment 103 includes a process management section 105, a prepress section 106, a digital print section 107, and a postpress section 108, which are mutually connected by a network 104 such as LAN. The whole printing processing is completed by executing four processes corresponding to each unit.

The process management section 105 commands work to each process of the prepress section 106, the digital print section 107, and the postpress section 108 on the POD site environment 103, and manages the workflow of the present system configured by computers and various kinds of devices in a unified way. Further, the process management section 105 can also receive print orders from end users, store orders from the end users, assemble work in each process as workflow based on the specification of the orders from the end users, efficiently schedule work of each device and work of workers, and notify operators as required when errors arise during automatic operation.

The prepress section 106 reads a paper original received from end users by a scan device such as scanner/MFP (Multi Function Peripheral), and stores the read original in a prepress server (not shown) and a client PC as a scanning image file. Further, the prepress section 106 also executes image correction, merge processing of files, insertion/deletion of pages, editing of various page layouts, facing processing or the like, and proof output which is trial printing to confirm layouts and color of resulting articles as required.

The digital print section 107 reads a paper original received from end users and outputs copies from a printing device by using a scan device such as a monochrome MFP and a color MFP in accordance with the work instruction of the print order received from the process management section 105 or the prepress section 106. Further, the digital print section 107 can also print documents/image files received from end users from client PCs through printer drivers or hot folders, scanned image files which are scanned with a scanner, or documents/image files obtained by editing those, on the printing device such a the monochrome MFP and a color MFP.

The postpress section 108 controls post-processing devices such as a folding machine, a saddle stitch binding, a case binding machine, a shearing machine, an inserting machine and a pasting machine, and executes finishing processing such as folding, saddle stitch binding, case binding, shearing, inserting and pasting according to the work command of postpress job received form the process management section 105, the prepress section 106 or the digital print section 107.

Figure 2:
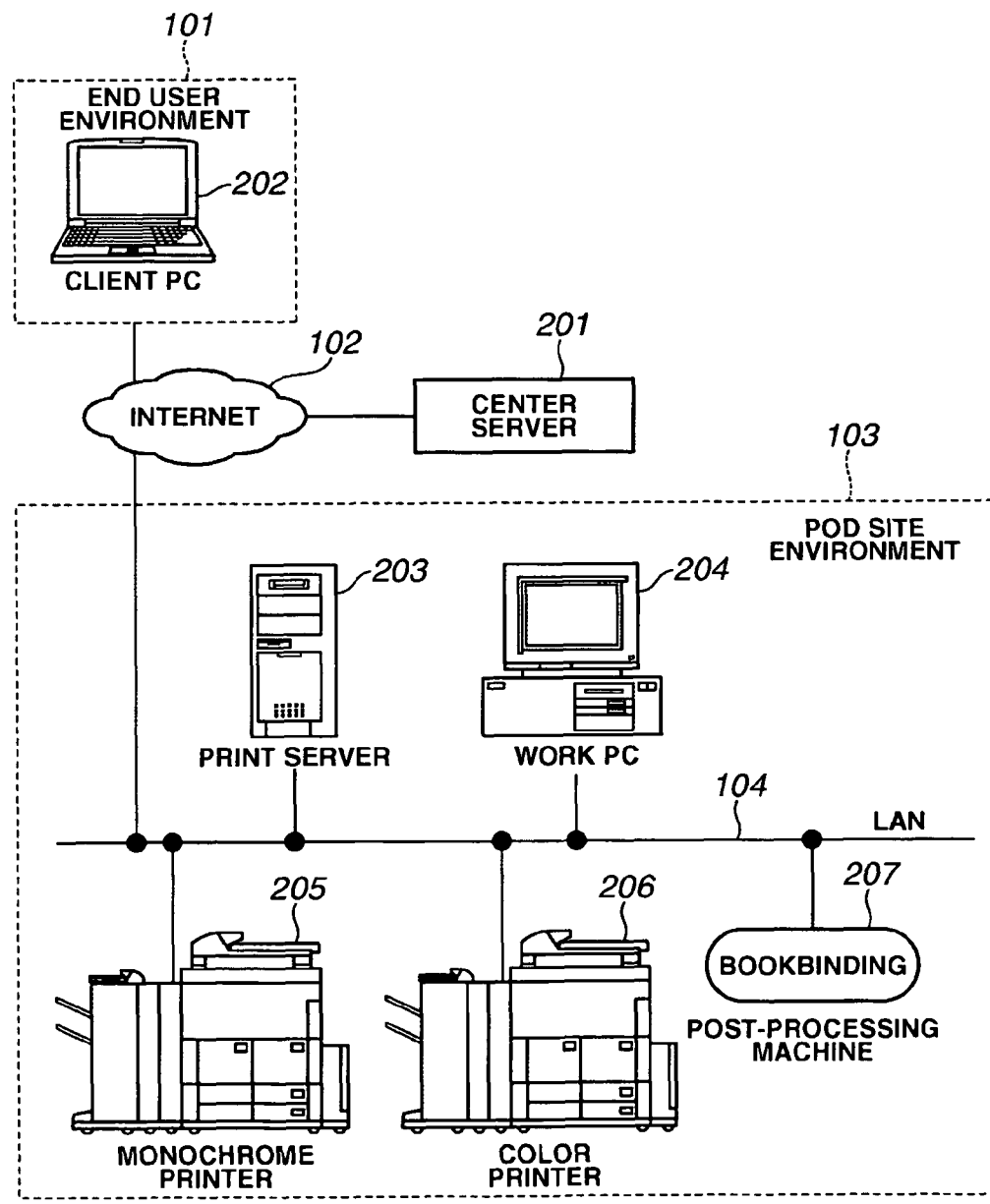
FIG. 2 is a diagram showing one example representing a configuration shown in FIG. 1 according to an embodiment of the present invention.

FIG. 2 is a system configuration diagram showing one example representing a configuration shown in a block diagram of FIG. 1. End users request print orders via a WEB screen or the like provided by a center server 201 from the end user environment 101 through the Internet 102 using a client PC 202 on which a WEB browser is mounted. Operators on the POD site environment 103 operate a work PC 204, thereby to obtain the print order stored in the center server 201 from end users through the Internet 102 to save the print order in a print server 203. This print order includes print order information and print data files. The process management section 105 creates a print order and commands work of the print data files to the prepress section 106, the digital print section 107, and the postpress section 108 according to information included in the print order information.

In the present embodiment, in the print server 203, a printing system which includes a program or the like for processing by the process management section 105, the prepress section 106, the digital print section 107, and the postpress section 108 is indicated to be executed, but not limited to this. Servers for processing by each section are separately placed, so that distributed processing can also be executed. The work PC 204, in addition to a console which controls various services provided from the print server 203 using an easy-to-use operation screen, can extract print data files stored in the print server 203, start predetermined application, and style a print format. Further, the work PC 204 is served as a work computer of operators including setting application which commands prepress processing, printing processing, and postpress pressing based on specified printing setting, and performs setting on the print server 203.

In the monochrome printer 205 and the color printer 206 included in the digital print section 107, though installation configurations are different depending on the POD site environment, many cases are commonly configured in combination with a high-speed monochrome printer and a high-quality color printer. If either configuration is used, in the present embodiment, a printing plan using these is scheduled with the device scheduler in the process management section 105 executed by the print server 203.

A post-processing machine 207 used in the postpress section 108 includes a shearing machine for shearing output results outputted from either printer described above, a bookbinding machine for binding the output results, a stapler, a puncher, a case binding machine, and a ring binding machine. Further, the installation configuration becomes different depending on the POD site environment similar to the printer. Note that devices such as PCs and printers which configure the POD site environment 103 are connected via the network (LAN) 104 and can collect a state status.

Figure 3:
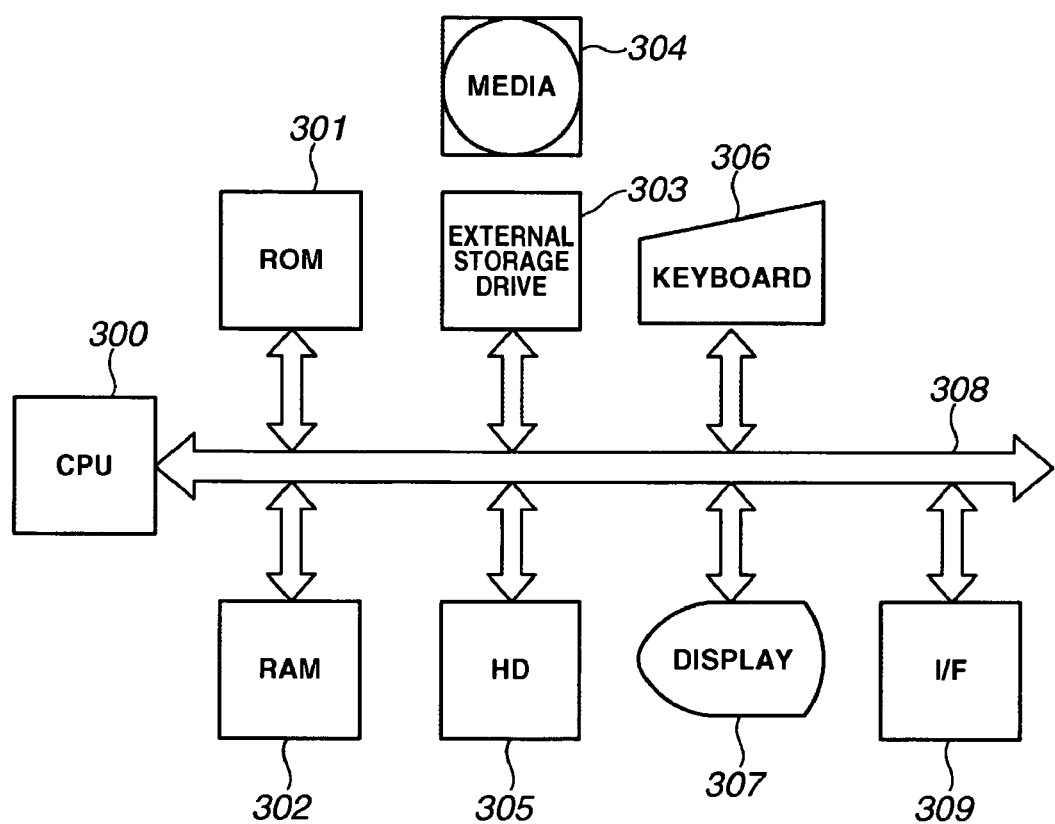
FIG. 3 is a block diagram showing a schematic configuration of a print server and a work PC according to an embodiment of the present invention

FIG. 3 is a block diagram showing a schematic configuration of the print server 203 and the work PC 204. A CPU 300 executes an application program, a printer driver program, an OS, a network printer control program or the like stored in an HD (hard disk) 305. At this time, the CPU 300 executes control of temporary storage of information, files or the like required to execute a program in a RAM 302. In a ROM 301, programs such as a basic I/O program, font data used during document processing and various data such as template date are stored. The RAM 302 functions as a main memory of the CPU 300, a work area and others.

Figure 5:
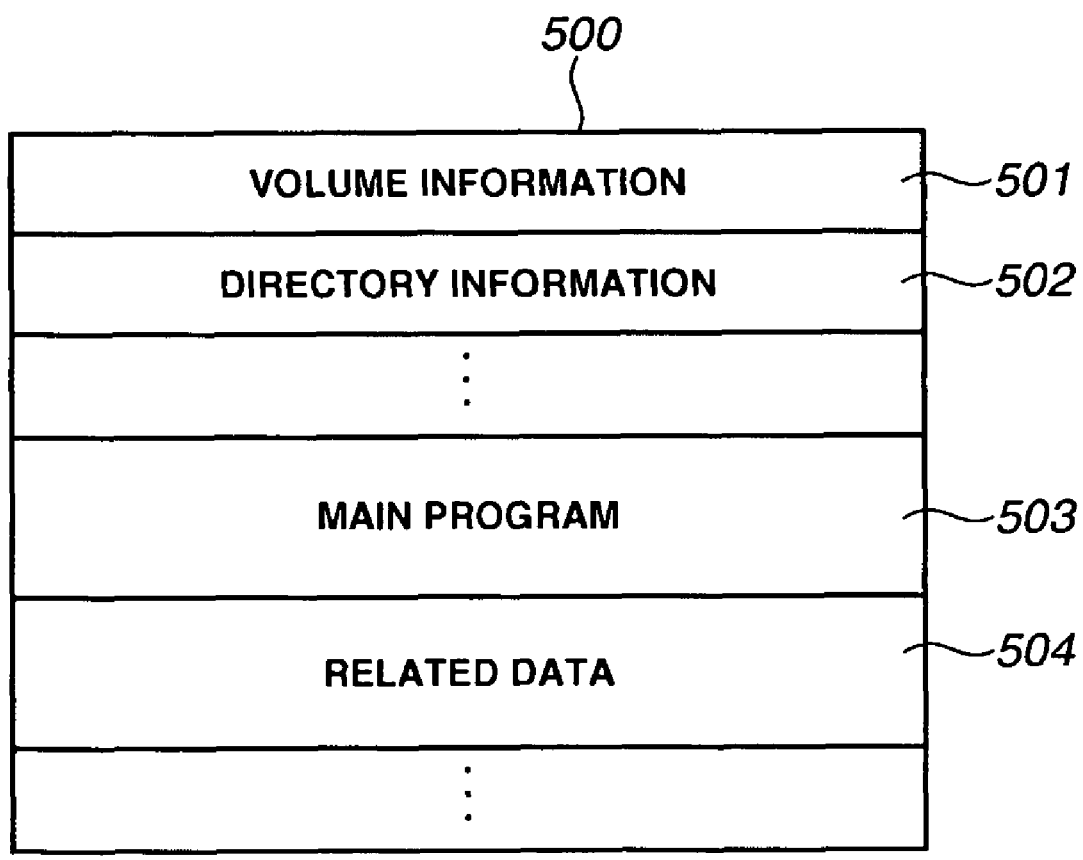
FIG. 5 is a diagram showing the contents of data of a medium according to an embodiment of the present invention.

An external storage drive 303 can load the present computer system with a program or the like stored in a medium 304. The medium 304 stores the program and related data which are described in the present invention. The stored contents are shown in FIG. 5. An HD 305 stores the application program, the printer drive program, the OS, the control program, related programs and others. A keyboard 306 serves as a unit in which users such as operators or the like input and instruct the command of a control command of devices or the like to client computers. A display 307 serves as a unit for displaying a command inputted from the keyboard 306, a state of the printer or the like. A system bus 308 controls the flow of data in the client computers. A network interface (hereinafter, referred to as I/F) 309 serves as a communication interface for connecting to a local area network (LAN) or the Internet.

Figure 4:
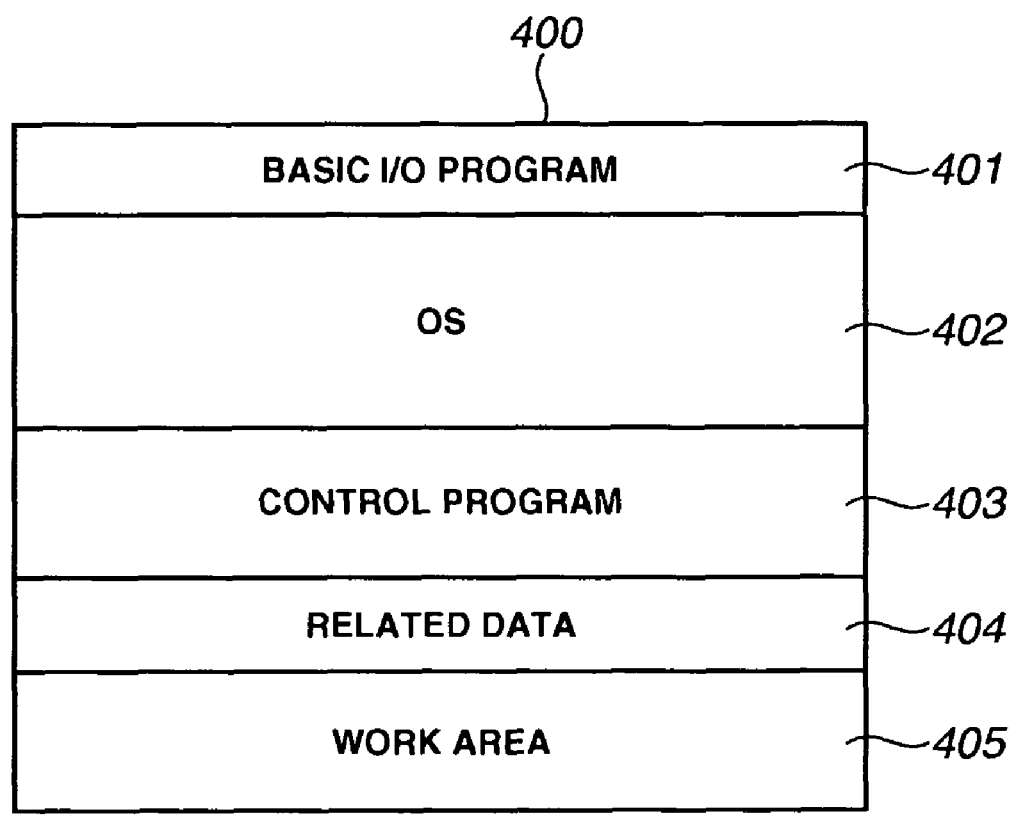
FIG. 4 is a diagram showing a memory map in a state in which a program according to an embodiment of the present invention is loaded into a RAM and becomes executable.

FIG. 4 illustrates a memory map 400 in a state in which a program according to the embodiment of the present invention is loaded into the RAM 302 and becomes executable. The present embodiment shows an example in which the program and the related data are directly loaded from the medium 304 into the RAM 302. However, in addition, the program and the related data may be loaded from the HD 305 into the RAM 302 whenever the program of the present embodiment is operated from the medium 304. Also, as the medium which records the program of the present embodiment, a FD, a CD-ROM, a DVD (digital versatile disk), an IC (integrated circuit) memory card or the like can be used. Further, the program of the present embodiment can be recorded in the ROM 301 to so as to become a part of the memory map, thereby being directly executed by the CPU 300. A basic I/O program 401 is an area with the program having an IPL (initial program loading) function or the like in which the OS is read from the HD 305 into RAM 302 and the OS operation stars when the power of the present controller is turned on. In an OS 402, a control program 403 and related data 404 are deployed. In a work area 405, areas required to execute the present program with the CPU 300 are secured.

FIG. 5 is a diagram showing the contents of data (500) of the medium 304, which includes volume information 501 indicating data information, directory information 502, a program 503 to be described in the present embodiment, and its related data 504.

Figure 6:
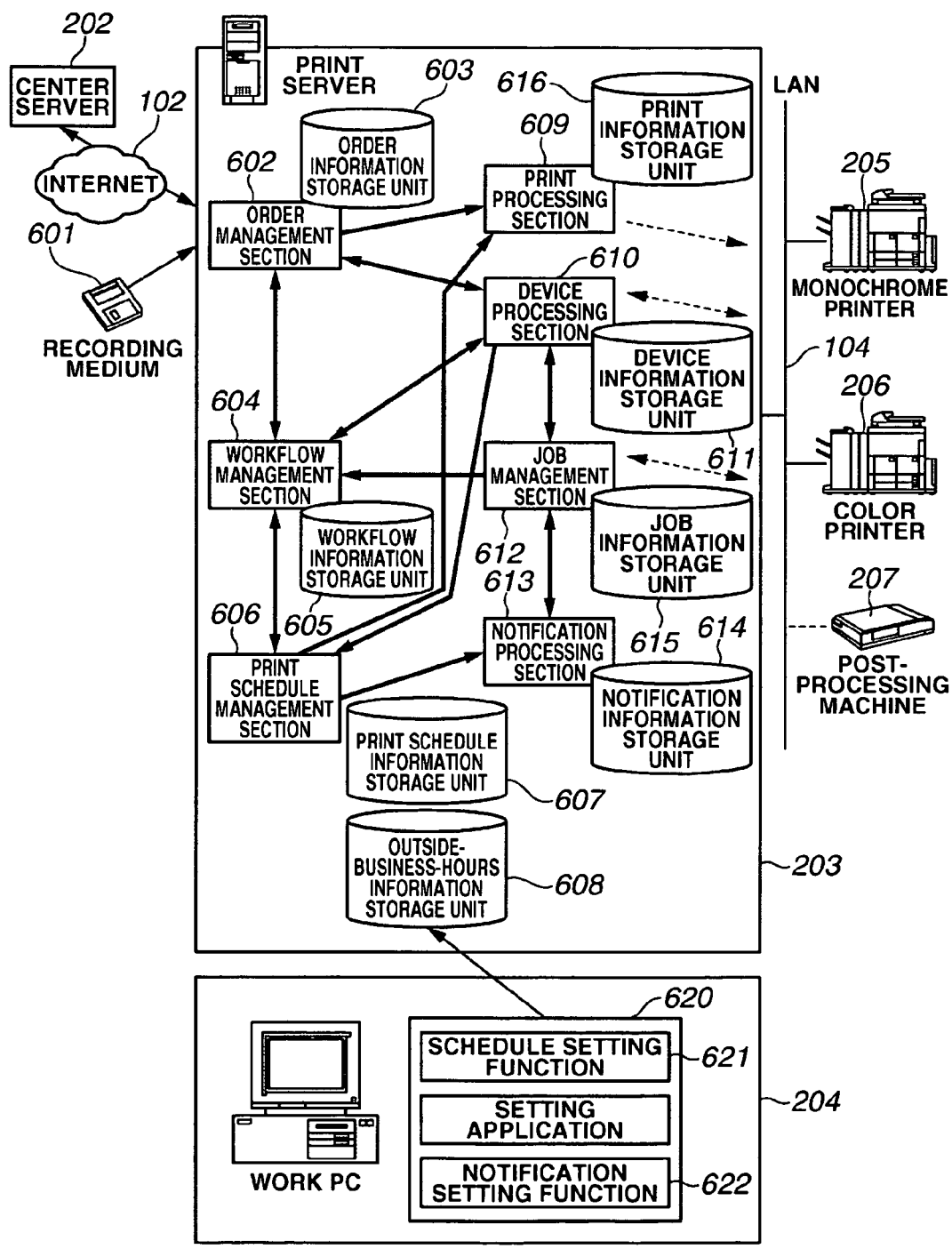
FIG. 6 is a diagram showing an exemplary configuration of a printing system according to an embodiment of the present invention for each function module.

FIG. 6 is a diagram showing an exemplary configuration of a printing system which features a print schedule management function for realizing automatic unmanned operation for each function module, and principally illustrating the function of the process management section 105 placed in the print server 203 on the POD site environment 103 described in FIG. 2. In FIG. 6, processing modules 602, 604, 606, 609, 610, 612, 613, and 620 serve as modules which are read from the ROM 301, the HD 305, or the external storage drive 303 shown in FIG. 3, are deployed into the RAM 302, and operates as application programs used in the CPU or a part of the program. In FIG. 6, information storage units 603, 605, 607, 608, 611, and 614 store information in at least any one of the HD 305, the RAM 302, and the external storage drive 303 in the print server 203 using a file system or a data base system.

Direct access to the information stored in the information storage units 603, 605, 607, 608, 611, and 614 can be executed by specifying a specific key and a condition.

Arrows shown in FIG. 6 indicate main flows in the flow of control and information between processing modules. The relation of the information processing unit (print server 203 and work PC 204), the processing module installed therein, and the information storage unit is informed to the CPU 300 as required, and each module is automatically executed or is deployed into the RAM 302 by the information or the instruction that operators input through the keyboard 306.

Processing modules required to execute computation in the CPU 300 and the information stored in the information storage unit are deployed from the ROM 301, the HD 305, the external storage drive 303, the RAM 302, or the like into the RAM 302. A result computed by the CPU 300 is written, as required, into the information storage unit present in the RAM 302, the HD 305, the external storage drive 303, or the like as the information on the computed result. Also, the computed result in the CPU 300 is simultaneously displayed, as required, on the display 307 as the information on the result. Transmission among the CPU 300, the RAM 302, the ROM 301, the I/F 309, the keyboard 306, the HD 305, and the external storage drive 303 is executed through the system bus 308.

The LAN 104, which is a network connected with the print server 203, the work PC 204, the monochrome printer 205, the color printer 206, and the post-processing machine 207 is a common network system. In the present embodiment, the LAN (Local Area Network) is used. However, other network systems may be used as long as the network is always connected.

An order management section 602, which is an order receiving unit, shown in FIG. 6 indicates software for managing the received print order. The order management section 602 extracts print information from order information collected from the center server 202 or the like through the Internet 102, and creates print order information (job ticket) required for printing. Note that information including image forming data and setting information that the order management section 602 receives from clients is referred to as the print order information.

One example of the contents stored in the print order information (job ticket 700) is shown in FIG. 7. Since the meaning of each value to be set is described on a list, the description in this embodiment is omitted. However, in addition to information on the print format shown in FIG. 7, information such as order number of sheets, money information, desired delivery time, delivery methods and delivery destination address is included. The information concerning the print order described above and print data are stored in an order information storage unit 603. Further, the print order is issued via a network through the Internet 102. Also, end users can store the order information and the print data in a physical recording medium 601 and send the recording medium 601. Further, the print order can also be created using the work PC 204 or the like on the POD site environment 103.

A workflow management section 604 creates workflow information in accordance with the print order information which is stored in the order information storage unit 603 and is managed by the order management section 602. For example, though the print order information includes information such as "color print" and "saddle stitch binding", use of devices to obtain a desired output result is not specified. Hence, the workflow management section 604 communicates with a device processing section 610 and obtains device information connected to a network, thereby specifying a device for processing the target print order information to allow creation of workflow. The workflow described in this embodiment indicates the flow of printing processing with respect to the print order (for example, "perform color print by a color printer and create saddle stitch binding by a bookbinding machine" or the like).

Workflow information is created in accordance with a rendering method and a printing method obtained from the device processing section 610 to be described later. The created workflow information is stored in a workflow storage unit 605. The created workflow information is read by a workflow management section 604, and the operation and the progress management of the workflow are executed. The workflow management section 604 displays the progress state of the workflow. Operators can perform operations which are decided for each process based on status information in the workflow. There are two cases where the workflow management section 604 is activated. One is the case where the workflow management section 604 is activated by the instruction of operators. Another is the case where the workflow management section 604 is activated by the command from the order management section 502 and the workflow is automatically set according to a predetermine rule. In the end process, the change of status is performed by operators themselves. Note that in some processes, the change of status is also executed automatically. For example, in an online printing device, a job management section 612, which is a job delivery unit to be described later, transmits printing completion notification to the workflow management section 604, so that the change of status is executed.

In order to perform an operation of bulk printing on schedule, a printer to be utilized by sharing needs to be operated efficiently and systematically. Thus, operators need to avoid the competition of the device and carry out a planned operation using the scheduling system. Reference numeral 800 shown in FIG. 8 denotes one display example of a scheduling system (a device scheduler displayed by a print schedule management section 606) capable of managing the schedule of a plurality of printers and simultaneously displaying a state of the schedule for each printer.

If operators activate the print schedule management section 606 which is a scheduling unit, from the work PC 204, a list 801 of the printer, the post-processing machine, and not-yet-allocated print order information shown in FIG. 8 is displayed on a screen. On this screen, operators can confirm the period of use 802 of the printer and the post-processing machine in a configuration of a predetermined rectangle in relation with business hours. Further, the print schedule management section 606 can create schedules by referring to space device information displayed on the screen of the device scheduler 800 and the workflow information obtained from the workflow management section 604. For example, the case in which the not-yet-allocated print order information without allocating the schedule yet is allocated to a specified schedule of a specified device or the like is included.

The print schedule setting information set by a schedule setting function 621 of setting application 620 which executes system setting of operation of the present printing system to be operated by operators with the work PC 204 is stored in a print schedule information storage unit 607 and an information storage unit 608 for outside business hours managed by the print schedule management section 606 shown in FIG. 6.

Operators or the like activate the schedule setting function 621 of the setting application 620 with the work PC 204. Thus, the print schedule management section 606 can set an execution procedure of printing and processing after printing by selecting the print order information type, time periods and device types. Note that the print schedule management section 606 can calculate the time required to process the print order information using the number of processed sheets of the print order information currently targeted and a printer function (for example, printing speed) required to process the print order information. The print schedule management section 606 executes scheduling using the calculated result.

Figure 9:
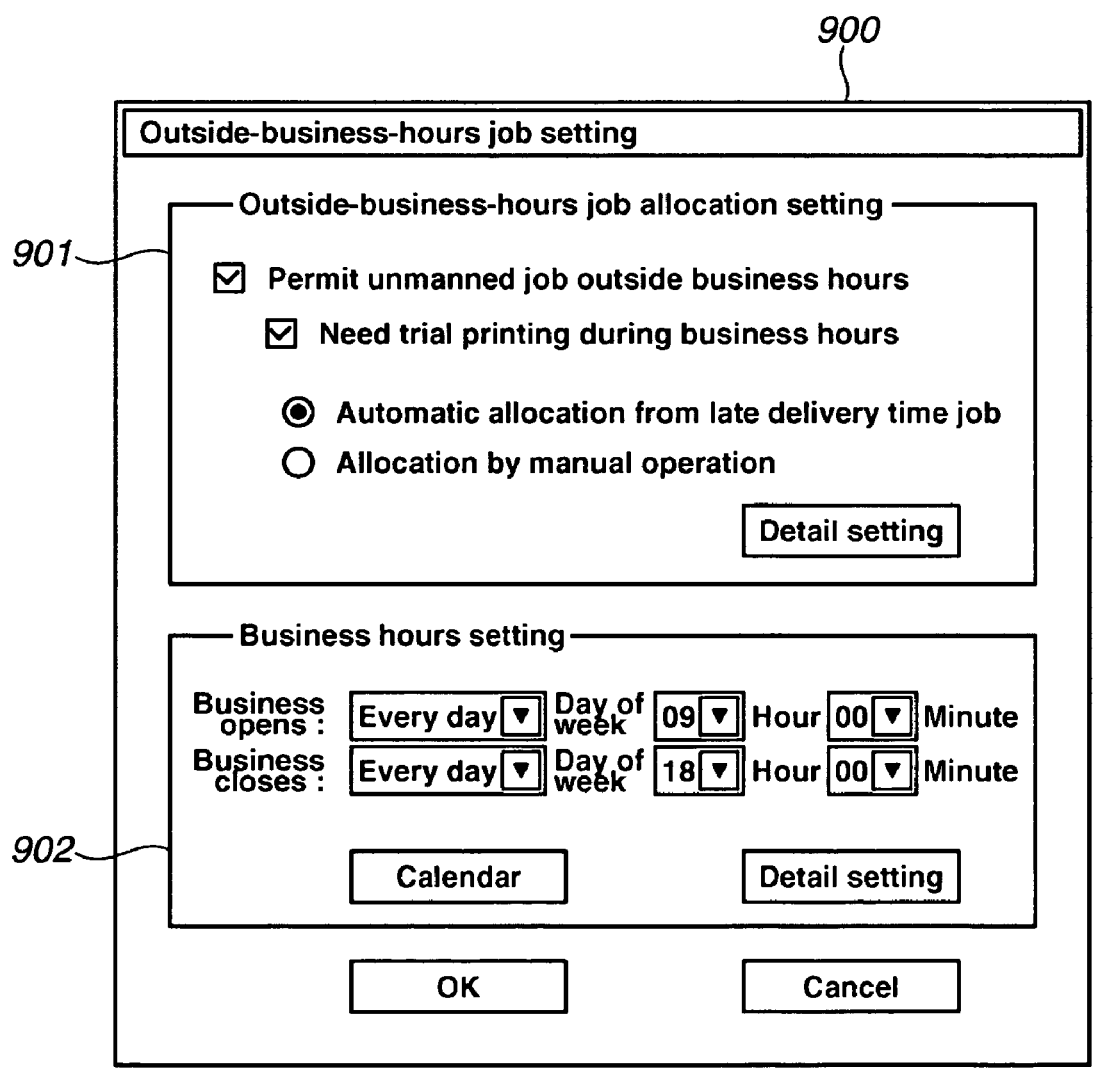
FIG. 9 is a diagram showing one example of an outside-business-hours job setting screen according to an embodiment of the present invention.

Further, since the schedule setting function 621 has a function so as to allow scheduling even outside business hours, an outside-business-hours job setting screen 900 for creating an outside-business-hours schedule shown in FIG. 9 is displayed by predetermined operations of operators. In order to execute the unmanned automatic operation outside business hours that operators are absent using the outside-business-hours job setting screen 900, property setting when operators are absent is executed using an outside-business-hours job allocation setting 901. Here, the property setting is, for example, a business-hour setting 902 which sets business hours on the POD site environment 103 shown in FIG. 9, a determination as to whether print order information allocation to the outside of business hours is permitted or not, a condition in the case of determining permission, selection of automatic allocation and manual allocation, and selection of candidates of the print order information possibly allocated to the outside of business hours by the allowance date to delivery time in turn.

The property information of the outside-business-hours print order information set in this embodiment is stored in an information storage unit 608 for outside-business-hours shown in FIG. 6. Also, a condition in which the attribute information for scheduling outside business hours is set is, for example, the case in which the hand processing (processing by manual work) of the print order information is not required by determining from the workflow information, or the case in which the allowance of the predetermined days is present to the delivery time is present. Further, a condition for scheduling outside business hours is, for example, the case in which the trial printing is completed in business hours, or the case in which the number of output sheets of the print order scheduled to the outside of business hours is less than the number of originals mountable on the specified printer.

Here, the screen of the device scheduler 800 shown in FIG. 8 will be described. On the screen of the device scheduler 800, at present, as the time, "Nov. 1, 2004, 9:30" is displayed, and the print order information required to be processed is allocated to the monochrome printer, the color printer, or the post-processing machine. Further, the print order information 802(A) required to be processed with the color printer is displayed as a not-yet-allocated printing job, so that, at the present stage, the required time zone to be processed is not set. For example, assume that the print order information 802(A) needs to be processed during today "Jan. 1, 2004).

However, if the schedule of the color printer is viewed, there is no space time to allow allocation of the print order information 802(A). Here, rescheduling is executed using the processing outside business hours described above. At present, in the print order information 802(B) allocated to the color printer, the attribute indicating processibity outside business hours is set. Therefore, in response to moving the print order information 802(A) as indicated by arrows (for example, by drag and drop processing), the print order information 802(B) is allocated to the time after 18:00 which is the outside of business hours.

Thus, when a not-yet-allocated print order information close to the delivery time is allocated to the inside of business hours of that day of the color printer, the print order information allocable to the outside of business hours in already allocated print order information is allocated to the outside of business hours. As a result of this, the not-yet-allocated print order information close to the delivery time can be processed with a desired printer during the date.

Figures 10, 11:
FIG. 10 is a diagram showing one example of an outside-business-hours job allocation confirmation screen according to an embodiment of the present invention.
FIG. 11 is a diagram showing one example of an outside-business-hours job allocation error screen according to an embodiment of the present invention.

In this case, an outside-business-hours job allocation confirmation screen 1000 shown in FIG. 10 is displayed to notify operators of the allocation of the print order information to the outside of business hours. If an "OK" button is depressed, the allocation to the outside of business hours is completed.

Since sheet supply to the printer can not be carried out outside business hours that operators are absent, the print order information which exceeds the number of mountable sheets can not be allocated. For example, if the print order information indicating that the processing outside predetermined hours is specified requires 600 printing sheets and a specified printer can mount only 400 printing sheets, the print order information indicating that 600 printing sheets are required to be output can not be allocated. To prevent this, the schedule management section 606 shown in FIG. 6 acquires device information from the device management section 610. Thus, if the print order information exceeding the number of mountable sheets of the printer is allocated to the outside of business hours, an error screen is displayed as shown in FIG. 11 to give a warning for allocation.

Figure 12:
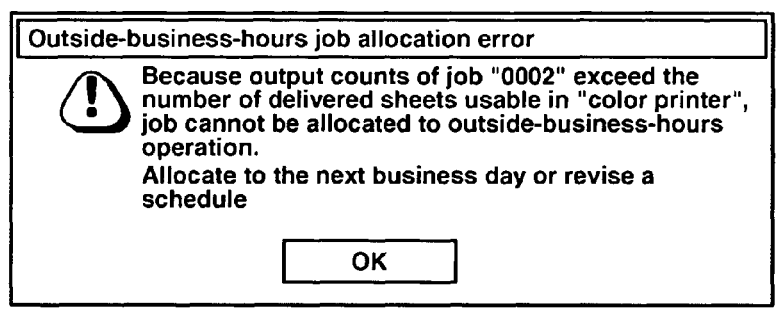
FIG. 12 is a diagram showing one example of an outside-business-hours job allocation error screen according to an embodiment of the present invention.

Similarly, output articles from a sheet delivery section of the printer cannot be acquired outside business hours that operators are absent. Thus, the printer cannot output sheets exceeding the number of usable sheets of the sheet delivery. For example, though the printer can mount only 500 output sheets on the sheet delivery section, if the output sheets are 1000 sheets, the printer cannot mount 1000 output sheets on the sheet delivery section. To prevent this, the print schedule management section 606 shown in FIG. 6 acquires information on the device from the device management section 610. Thus, if the output sheets based on the print order information to which the attribute indicating allocatability to the outside of predetermined hours is set is determined to exceed the number of usable sheets of the sheet delivery, an error screen such as an display example shown in FIG. 12 is displayed to give a warning for allocation.

Accordingly, the print schedule information in business hours and outside business hours set using the device scheduler 800 shown in FIG. 8 is stored in the print schedule information storage unit 607 shown in FIG. 6.

In the work flow management section 604, when the status executing printing processing arrives, a printing processing section 609 is started and the print order information registered in the order information storage unit 603 of the order management section 602 is acquired. Next, these data are downloaded into the work PC 204, the printing data of the corresponding order are selected by operators or the like with the work PC 204, and printing is started. Moreover, in the print schedule management section 606, when the print order scheduled to the outside of business hours arrives at printing start time, the printing processing section 609 is started by the command from the print schedule management section 606, the print order information which is registered in the order information storage unit 603 of the order management section 602 and is a processing target outside business hours is acquired, and printing processing is automatically executed. Note that even in business hours, the printing processing may automatically be executed. That is, the print schedule management section 606 specifies the print order information required to start processing from the schedule information stored in the print schedule information storage unit 607 or the information storage unit 608 for outside business hours, and notifies the information to the order management section 602. Thus, the print job stored in the order information storage unit 603 is delivered to the printing processing section 609, and the printing processing is executed using the print order information.

When printing starts, the job management section 612, which is software to manage the print order information, communicates with the monochrome printer 205, the color printer 206, the post-processing machine 207 connected to the LAN 104 and others, and monitors the print order information to be processed. The device management section 610, which is software for managing the devices to be used in various printing processes, manages installation information (network address, manager, etc.) of each printer. Then, the device management section 610 periodically communicates with the printer, acquires the status (state of operation, state of occurrence of error/warning), and manages the printer.

Further, the device management section 610 periodically communicates with the printer and holds the device information such as the capability information of the printer (processing rate per unit time, finishing function of bookbinding/staple/punch, etc.) and consumable article information (paper/toner/staple needle, etc.) in a device information storage unit 611. Furthermore, the device management section 610 includes a function for sequentially notifying the device information in accordance with the request from the order information storage unit 603, the work flow management section 604, the print schedule management section 606, and the job management section 612.

Figure 16:
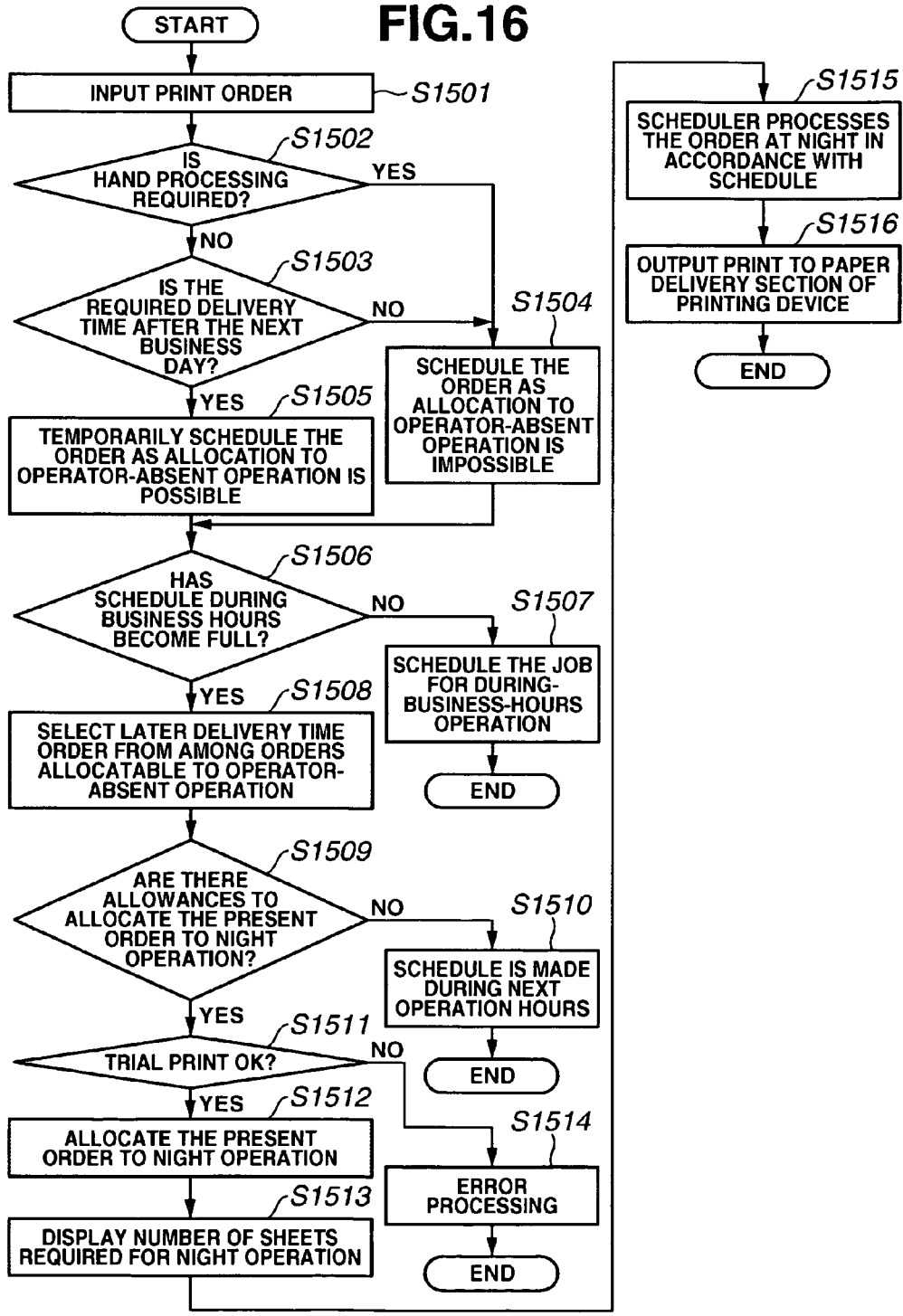
FIG. 16 is yet another flow diagram showing a series of exemplary processes according to an embodiment of the present invention.

Referring to the flow chart shown in FIG. 16, an outline of exemplary processing of the printing system having the print device scheduler for executing the automatic unmanned operation according to the present embodiment will be described bellow. FIG. 16 shows a series of processing flows from receiving of the print order by operators on the POD site environment 103 to allocate the print order to the outside of predetermined hours (for example, nighttime that operators are absent) until execution of the automatic unmanned operation. Note that in the flow chart described in the present embodiment, the processing is executed by the CPU 300.

First, in step S1501, the order management section 602 receives the print order that end users request to a printing site having the POD site environment 103 through the Internet or using the recording medium 601, and stores the print order in the order information storage unit 603 as print order information.

In step S1502, the work flow management section 604 specifies a printer device (for example, a color printer 206) to be requested to obtain print output articles from the contents of the print order information stored in the order information storage unit 603 in step S1501, and determines whether the hand processing, which requires manpower such as sheet supply during printing, acquisition of the output articles and post-processing, is required or not. More specifically, since the information indicating hand processing which requires manpower is held in the RAM 302, the work flow management section 604 compares the print order information stored in the order information storage unit 603 and the information indicating the hand processing held in the RAM 302. Thus, it is possible to determine whether the hand processing is required or not.

In step S1502, if the hand processing is required, the operation proceeds to step S1504. In step S1504, the work flow management section 604 sets the attribute indicating that the allocation to an operator-absent operation is impossible to the print order information currently targeted, and holds the attribute in the RAM 302. In step S1502, if the hand processing is not required, the operation proceeds to step S1503.

In step S1503, the print schedule management section 606 refers to a desired delivery time from the order information storage unit 603 storing the print order information, and sets the attribute indicating processability outside predetermined hours if the delivery time that the end user desired is after the next business day, at the time of schedule allocation of the print order information to be temporarily scheduled (step S1505). Note that the above-described predetermined outside hours indicate outside-business hours or operator-absent hours. That is, since the desired delivery time is after the next business day, even if the processing is not especially executed during today, the delivery time is in time if the processing is executed outside business hours or next day. Accordingly, it is determined that depending on the state of scheduling, the processing may be scheduled to be executed outside business hours and the processing such as step S1505 is executed.

Further, if the print schedule management section 606 determines that the delivery time that the end user desired is within the next business day, the print order information needs to be processed in business hours without performing an automatic unmanned operation outside business hours, and is thus scheduled to be executed in business hours (step S1504). That is, since the desired delivery time is within the next business day, the printing process needs to be executed as soon as possible. Hence, the print order information having the delivery time within the next business day is preferentially scheduled to be executed in business hours.

In step S1506, if the print schedule management section 606 determines that the print order information temporarily scheduled in step S1505 has allowances allowing allocation in business hours (step S1506-No), in step S1507, the print schedule management section 606 allocates the print order information in predetermined hours (for example, in business hours). Thus, when printing starting time arrives, the print schedule management section 606 prompts operators to start printing processing (step S1507), and a series of processing in the present flow chart ends. Note that in step S1507, it has been described that operators were prompted to start printing processing. However, the printing processing may also start automatically when printing starting time arrives. On the other hand, when the schedule has no space in business hours (step S1506-Yes), the operation proceeds to step S1508.

In step S1508, the print schedule management section 606 selects the print order information having a later delivery time that end users desires in turn as candidates of the operator-absent-hours allocation such as nighttime from within the print order information which sets the attribute indicating that the operator-absent-hours allocation is possible in step s1505. When the print schedule management section 606 makes operators confirm the contents of the print order information, a screen such as a display example shown in an outside-business-hours job allocation confirmation screen 1000 in FIG. 10 is displayed.

In step S1509, the print schedule management section 606 determines whether the print order information selected in step S1508 can be allocated to nighttime until the next business day or not. Note that the print schedule management section 606 also determines whether the number of sheets is within the range of not more than the number of mountable sheets of the printer for use, and whether the number of sheets to be delivered is within the range of not more than the number of mountable sheets of the sheet delivery of the printer for use.

In step S1509, if the print schedule management section 606 determines the print order information selected in the step S1508 to have no allowances to allocate it to nighttime (step S1509-No), the operation proceeds to step S1510. In step S1510, the print order information is scheduled to be processed in business hours on the next business day, and a series of processing in the present flow chart ends. On the other hand, if the print schedule management section 606 determines the print order information to have allowances to allocate it to nighttime (step S1509-Yes), the operation proceeds to step S1511.

In step S1511, when the print schedule management section 606 allocates the print order information to an outside-business-hours operation, to prevent errors of outputs during an unmanned operation, the print schedule management section 606 displays a UI to make operators confirm that the trial printing is completed beforehand and a print output has no problem and makes operators perform the trial printing. In step S1511, if the trial printing of the print order information results in errors (step S1511-No), the operation proceeds to step S1514. In step S1514, the print order information is removed from the candidates of operator-absent-hours allocation, and error processing is executed. Then, a series of processing in the present flow chart ends. On the other hand, in step S1511, if it is determined that the trial printing of the print order information does not result in errors (step S1511-Yes), the operator-absent-hours processing is determined possible, and the operation proceeds to step S1512.

In step S1512, the print schedule management section 606 allocates the print order information determined no errors in the trial printing to the predetermined outside-business-hours schedule in the specific printer (for example, color printer 206). Thus, the scheduling is fixed and the print order information is stored in the print schedule information storage unit 607.

Note that in the determination of the print schedule management section 606 in steps 1509 and 1511, when the number of sheets or the number of delivered sheets is not covered by the specific printer alone, the print order information may be spread to a plurality of printers and may be printed in parallel.

In step S1513, the print schedule management section 606 displays the number of sheets or the like required outside business hours on the screen of the work PC 204 before entering the outside of business hours. Thus, operators can be prompted to perform the work such as sheet supply in advance. Note that until the sheet supply or the like is performed by operators, the outside-business-hours allocation may be prohibited.

In step S1515, in nighttime until the next business day, when the time planned to execute the unmanned operation arrives, the print schedule management section 606 starts the printing processing section 609, acquires the print order information registered in the order information storage unit 603 of the order management section 602 and commands the scheduled printer (for example, color printer 206) to start printing. In step S1516, the specified printing device (for example, color printer 206) executes printing processing. Thus, operators can obtain output articles at the beginning of the next business day.

Thus, the attribute is set which can allocate the print order information satisfying a predetermined condition (for example, hand processing is not required or the like) to the outside of predetermined hours (for example, when operators are absent). Accordingly, even in the case in which the print order information cannot be allocated to an operation in predetermined hours (for example, in business hours), since the print order information in which this attribute is set is scheduled to be processed outside predetermined hours, time can be effectively used. Further, there are no cases in which users reconsider schedules after the scheduling in predetermined hours is determined impossible, and the convenience can be enhanced. Further, since the print order information allocated to the outside of predetermined hours is subjected to the trial printing or the like before the processing is executed outside predetermined hours, the occurrence of printing process errors can be prevented beforehand. Further, since the print order information allocated to the outside of predetermined hours does not require hand processing, it does not affect the schedule of the print order information required to perform the hand processing on the next business day.

Second Exemplary Embodiment

As described above, in the first embodiment, it is determined whether the print order information can be processed when operators are absent according to a predetermined condition, so that the efficient printing processing is executed. A second embodiment is directed to the case in which the processing of the print order information when operators are absent results in occurrence of errors or the like.

Figure 13:
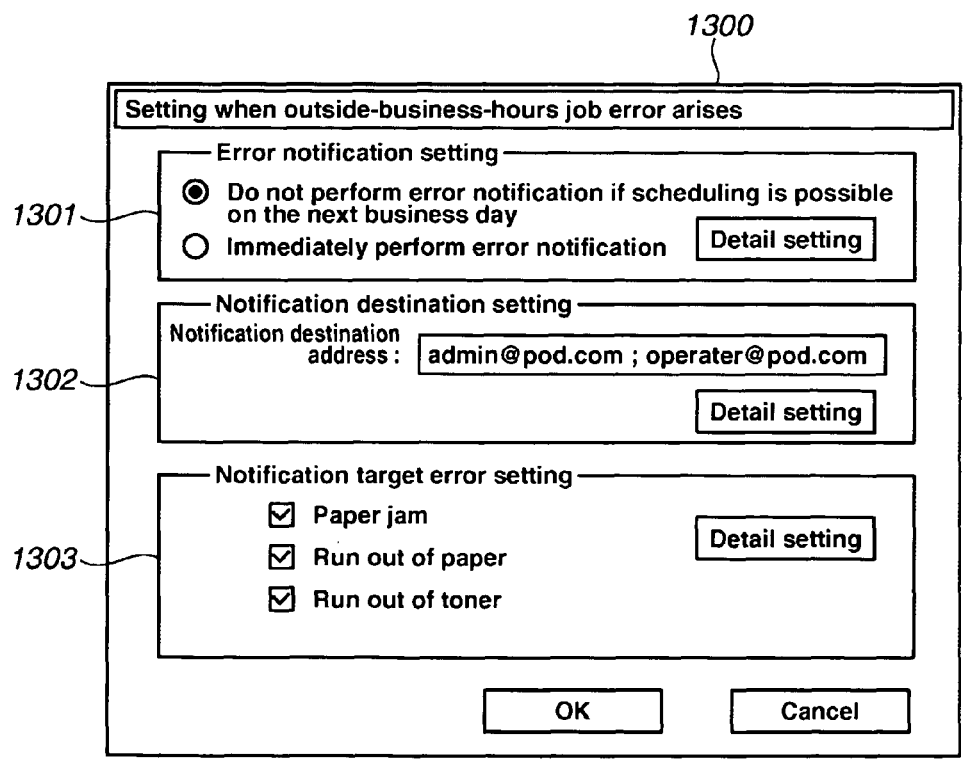
FIG. 13 is a diagram showing one example of a setting screen when outside-business-hours job errors arise according to an embodiment of the present invention.

In a notification information storage unit 614 managed by a notification processing section 613 shown in FIG. 6, notification setting information set by a notification setting function 622 of a setting application 620 which executes system setting of the operation of the present printing system that operators operate with the work PC is stored. The notification setting function 622 of the setting application 620 is executed by operators with the work PC 204 or the like. Then, in a setting screen when outside-business-hours job error arises 1300 as exemplified in FIG. 13, the operation when errors arise at the time of executing an automatic unmanned operation when operators are absent is specified.

The setting screen when outside-business-hours job error arises 1300 can be used to set an error notification setting 1301 or the like for setting as to whether errors are immediately notified when the errors arise, whether errors are not notified immediately when the desired delivery time of end users is satisfied even if the target print order information is rescheduled on the next business day, or the like. Further, on this screen, setting buttons such as a notification destination address setting 1302 for setting a notification method such as a pager, telephone, e-mail, etc., and its notification destination address, and a notification target error setting 1303 for setting as to what kind of errors arising (incomplete print data/paper jam/run out of toner/run out of sheet, etc.) becomes a target of error notification, are provided. Note that the set information is stored in the notification information storage unit 614 shown in FIG. 6.

When printing start time of the print order information scheduled to the outside of predetermined hours arrives, the printing processing section 609 starts according to the command from the print schedule management section 606. The print schedule management section 606 acquires the print order information registered in the order information storage unit 603 of the order management section 602. Next, when the printer is activated and printing starts automatically, the job management section 612 communicates with the target printer (for example, color printer 206) and monitors the processed print order information. In the automatic unmanned operation, when the job management section 612 detects errors, it detects the cause of the errors (incomplete print data/paper jam/run out of toner/run out of sheet, etc.) in cooperation with the device processing section 610. If the information which is set so as to immediately notify when errors arise is stored in the notification information storage unit 614, the notification processing section 613 notifies the notification destination address of operators stored in the notification information storage unit 614.

On the other hand, if the setting of no immediate notification of errors when the desired delivery time of end users is satisfied even if the target print order information is rescheduled on the next business day when the errors arise is stored in the notification information storage unit 614, the detail of the errors or the like is notified to the print schedule management section 606. The print schedule management section 606 allocates the print order information to the next business day if the detail of the errors is limited to the print order information which is currently being processes. Also, if the errors arising are related to the remaining print order information scheduled after the currently targeted print order information, the print order information containing remaining print order information is allotted to the next business day to be temporarily scheduled.

Thus, if the print order information the delivery time of which is not in time is extracted from the print order information temporarily scheduled to be processed on the next business day, an error notification is requested to the notification processing section 613. The notification processing section 613 notifies the notification destination address of operators stored in the notification information storage unit 614 according to the notification method stored in the notification information storage unit 614.

Figure 14:
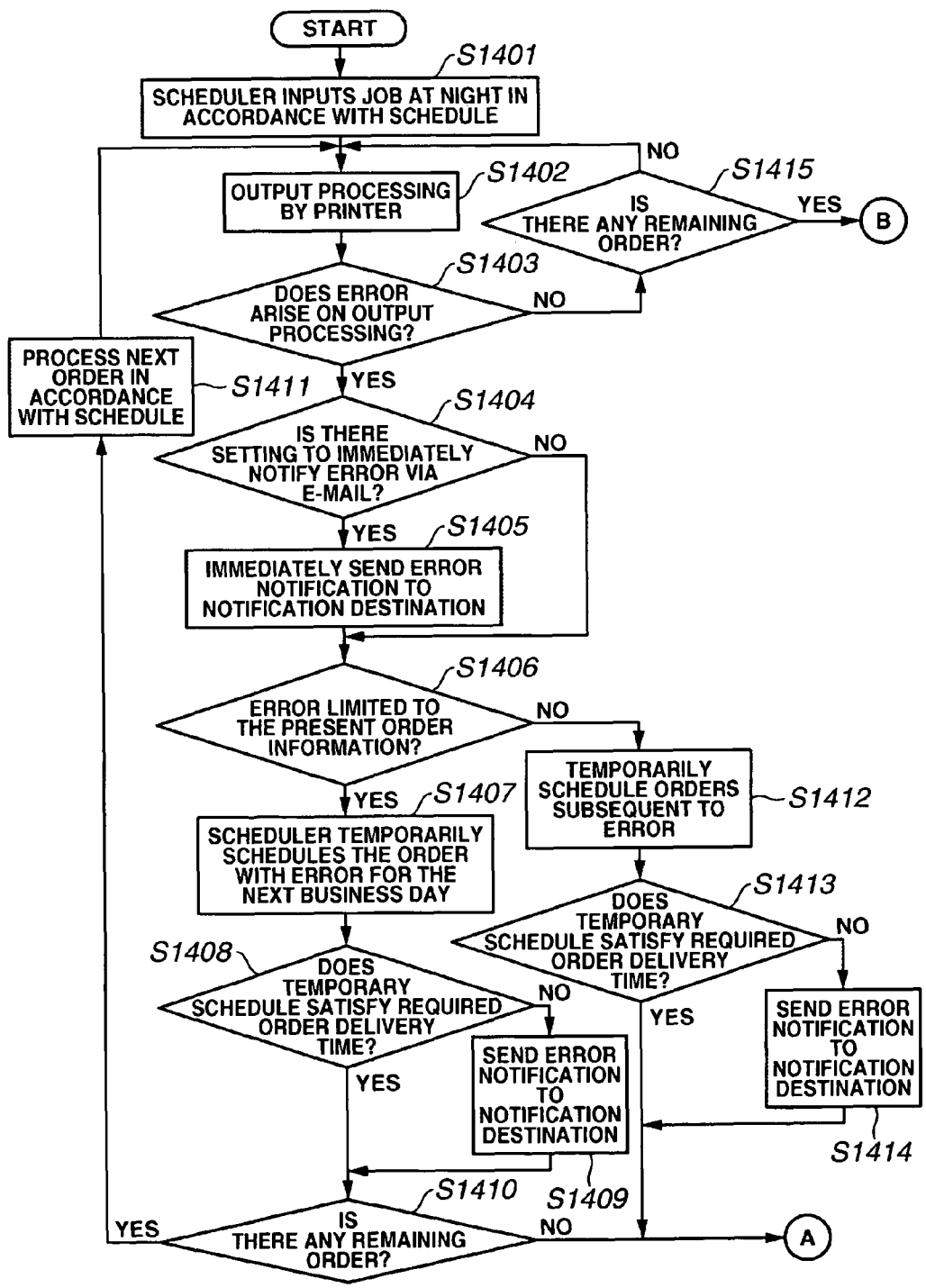
FIG. 14 is a flow diagram of a series of exemplary processes according to an embodiment of the present invention.
Figure 15:
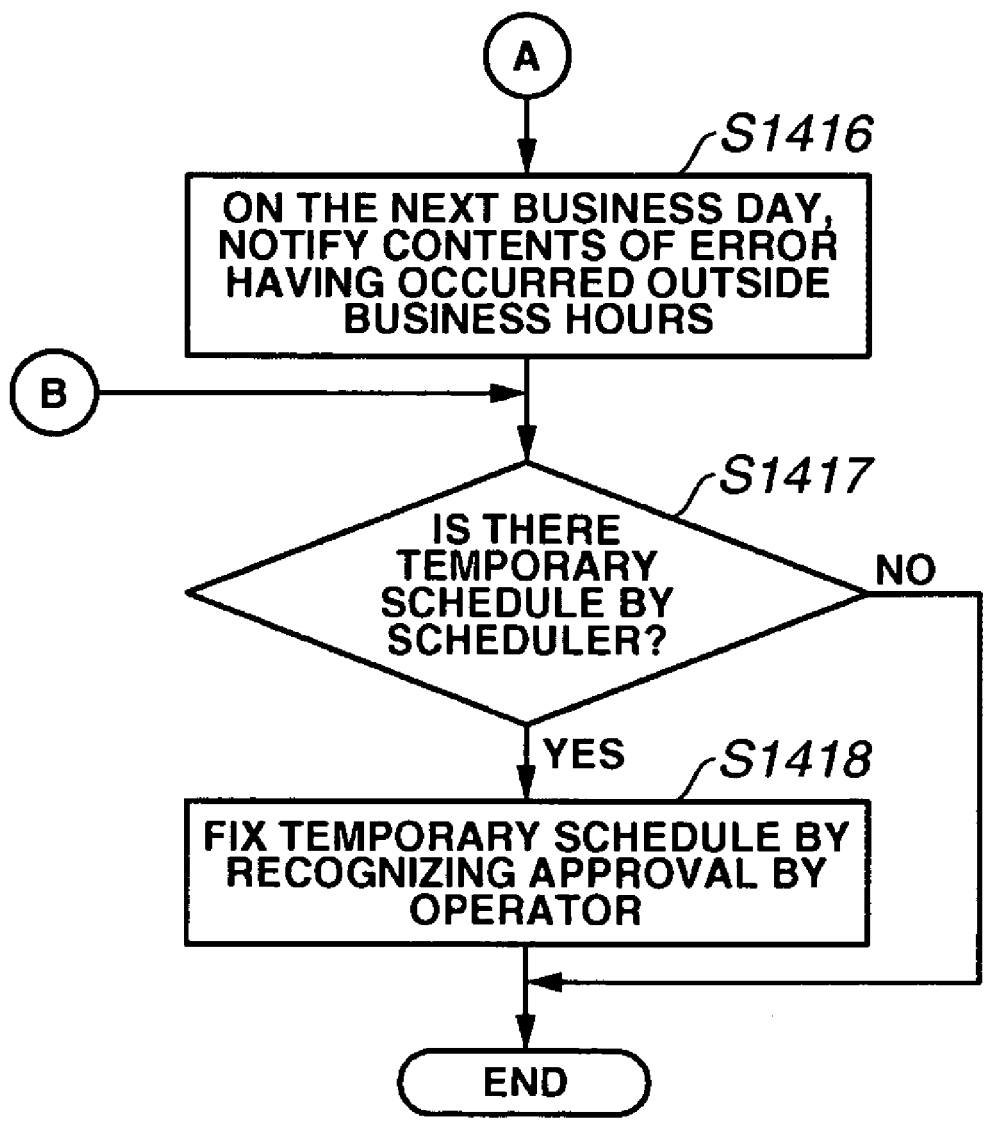
FIG. 15 is another flow diagram showing a series of exemplary processes according to an embodiment of the present invention.

When the print schedule management section 606 allocates the target print order information to the next business day to temporally schedule it and the delivery time of the print order information temporarily scheduled is in time, the temporary schedule information is stored in the print schedule information storage unit 607. At this time, the schedule may be created so as to be fixed with approval of operators on the next business day. Alternatively, the print schedule management section 606 can notify operators of the temporary schedule information, so that the schedule can be fixed with approval of operators The outline of processing in the case of the occurrence of errors when an automatic unmanned operation is executed at the time of the absence of operators due to a print schedule management function according to the present embodiment will sequentially be described bellow with reference to a flow chart shown in FIGS. 14 and 15. The print schedule management section 606 in the print server 203 on the POD site environment 103 automatically processes the print order information in accordance with the set schedule when operator are absent. In FIGS. 14 and 15, when errors arise, the print order information is temporarily scheduled to be processed on the next business day and is approved by operators on the next business day, so that the schedule is fixed.

First, the print order information requested from end users is adjusted with other print order information, which is already scheduled in cooperation with the order management section 602, the work flow management section 604, and the print schedule management section 606 in the print server 203. Since the attribute indicating processibity outside predetermined hours (for example, operator-absent hours such as nighttime) is set to several print order information already scheduled, the scheduling of the original print order information can use any method which is widely known in the present field of art.

Referring now to FIG. 14, in step S1401, when the time in which the print order information is processed by the unmanned operation arrives in nighttime until the next business day, the print schedule management section 606 activates the printing processing section 609. Then, the print schedule management section 606 acquires the print order information registered in the order information storage unit 603 of the order management section 602. Next in S1402, the print order information is processed.

In step S1403, it is determined whether the job management section 612 detects errors when the print order information is processed in step S1402. More specifically, the job management section 612 communicates with the target printer (for example, color printer) as described above and monitors the print order information. Thus, the job management section 612 can determine whether errors arise or not at the time of output. Note that when in step S1403, the occurrence of errors is determined, the cause of the errors (incomplete print data/paper jam/run out of toner/run out of sheet, etc.) may be searched in cooperation with the device processing section 610, and the cause of the errors may be held in the job information storage unit 615. Also, when errors are not detected in step S1403, the operation proceeds to step S1415. In step S1415, the print schedule management section 606 determines whether the print order information scheduled next is present or not. More specifically, in step S1415, the print schedule management section 606 checks outside-business-hours schedule information stored in the information storage unit 608 for outside business hours.

In step S1404, it is determined whether the notification information storage unit 614 is set to immediately notify when errors arise. Note that since the information indicating whether immediate notification needs to be executed or not is stored in the notification information storage unit 614 as described above, the notification information storage unit 614 checks this information in step S1404.

In step S1404, when immediate notification of errors is determined (step S1404-Yes), in step S1405, the notification processing section 613 issues a notification using the notification destination address and the notification method of operators stored in the notification information storage unit 614. Here, it is noted that operators who receive the error notification may take nighttime measures depending on the detail of the errors and as required. On the other hand, if, in step S1404, the notification information storage unit 614 recognizes information for setting no immediate notification when the desired delivery time of end users is satisfied even if, in the case of occurrence of errors, the target print order information is rescheduled to be processed on the next business day (step S1404-No), the operation directly proceeds to step S1406 without performing the error notification to operators.

In step S1406, the device management section 610 determines whether the detected error type is the detail of the errors (incomplete print data, etc.) limited to this print order information. More specifically, in the RAM 202, the error information limited to the print order information in processing and the error information affecting remaining print order information are stored beforehand. Thus, in step S1406, the errors detected by the device management section 610 is compared with the error information stored in the RAM 202. Note that the detail of the detected errors is stored in the device information storage unit 611.

In step S1406, if the errors are determined to be errors limited to this print order information (step S1406-Yes), the operation proceeds to step S1407. If the detail of the errors is also related to the remaining print order information scheduled to the target printer (paper jam, etc.), the operation proceeds to step S1412.

In step S1407, the print schedule management section 606 acquires the print schedule of the next business day stored in the print schedule information storage unit 607, and temporarily schedules the print order information, in which errors have arisen, to be processed on the next business day. More specifically, this indicates that the print schedule management section 606 allocates the print order information currently being processed, in which errors have arisen, to the printing schedule of the next business day obtained form the print schedule information storage unit 607. Note that the temporarily scheduled contents are held in the print schedule information storage unit 607.

In step S1408, the print schedule management section 606 determines whether the print order information temporarily scheduled to be processed on the next business day satisfies the delivery time which end users desire. More specifically, since the desired delivery time of this print order information is held in the order information storage unit 603, the print schedule management section 606 compares the processing finishing time obtained by temporarily scheduling this print order information and the desired delivery time of this print order information obtained in cooperation with the order information storage unit 603.

If, in step S1408, the print schedule management section 606 determines that the print order information temporarily scheduled does not satisfy the desired delivery time (step S1408-No), the operation proceeds to step S1409. In step S1409, the notification processing section 613 acquires the notification destination address and the notification method of operators stored in the notification information storage unit 614 and notifies the detail of the errors. (Operators who receive the error notification take nighttime measures depending on the detail of the errors and as required.)

On the other hand, in step S1408, if the print order information temporarily scheduled to be processed on the next business day is determined to satisfy the delivery time that end users desire (step S1408-Yes), the notification processing section 613 does not notify operators of the errors, and the operation directly proceeds to step S1410.

In step S1410, the print schedule management section 606 determines whether the print order information required to be processed after this print order information is scheduled or not. Note that since the detail of the present step is similar to step S1415 described above, the detailed description is not repeated herein. If, in step S1410, the print schedule management section 606 determines that there is the print order information required to be processed after this print order information, the operation proceeds to step S1411. In step S1411, the next print order information is processed according to the outside-business-hours schedule stored in the information storage unit 608 for outside business hours. On the other hand, in step S1410, if the remaining print order information required to be processed after the print order information is not scheduled, the operation proceeds to step S1416.

In step S1406, if the detail of the errors detected by the device management section 610 is the detail of errors (paper jam, etc.) related also to the remaining print order information after the print order information which is scheduled to the printer that the print order information is currently processed, the operation proceeds to step S1412. Note that since the detail of step S1406 has been described above, this is not repeated herein.

In step S1412, the print schedule management section 606 acquires the print schedule of the next business day stored in the print schedule information storage unit 607, and temporarily schedules the print order information which is scheduled to the printer targeted by the print order information currently being processed in which the errors have arisen, and the print order information after this print order information to be processed on the next business day. More specifically, the print schedule management section 606 allocates the print order information currently being processed in which the errors have arisen, and the print order information after this print order information to the print schedule of the next business day obtained from the print schedule information storage unit 607. Note that the temporarily scheduled contents are held in the print schedule information storage unit 607.

In step S1413, if the print schedule management section 606 determines that the print order information on the next business day temporarily scheduled by the processing in step S1412 does not satisfy the delivery time that end users desire (step S1413-No), the operation proceeds to step S1414. In step S1414, the notification processing section 613 executes notification processing using the notification destination address and the notification method of operators stored in the notification information storage unit 614. On the other hand, in step S1413, if the print schedule management section 606 determines that the print order information on the next business day temporarily scheduled by the processing in step S1412 to satisfies the delivery time that end users desire, the error notification to operators is not executed and the operation proceeds to step S1416.

In step S1416, the print schedule management section 606 displays processing contents and error contents of the automatic unmanned operation when operators are absent on the confirmation screen on the work PC 204 on the next business day, and makes operators confirm those. Note that since the detail of the errors is stored in the device information storage unit 611, the print schedule management section 606 cooperates with the device management section 610 managing the device processing section 610, so that recognition can be made. Even when no immediate error notification is set in the case of the occurrence of errors when the unmanned operation is executed at night, operators can confirm the detail of the errors via a recognition screen and take the measures required for the errors.

In step S1417, if the print schedule management section 606 determines that there is the temporary schedule on that business day obtained by rescheduling the print order information which is subjected to the effect of errors having arisen when the unmanned operation is executed at night (S1417-No), the operation proceeds to step S1418. While on the other hand, if there is no temporary schedule by the scheduler (S1417-Yes), the process then ends.

In step S1418, the print schedule management section 606 reads the temporary schedule held in the print schedule information storage unit 607, displays the temporary schedule on the display section of the work PC, and recognizes approval from operators (executed by the screen that the work PC 204 displays). In step S1418, when the print schedule management section 606 has recognized the approval instruction from the operators, the print schedule management section 606 stores the temporary schedule stored in the print schedule information storage unit 607 as the print schedule of that business day and fixes the print schedule of that business day.

According to the present embodiment, in the printing system shown in FIG. 1, when it is determined that the print order information satisfies the delivery time that users desire, the hand processing by operators is not required and the operation outside predetermined hours (automatic unmanned printing) is possible, the print order information can be allocated to the outside of predetermined hours (when operators are absent). Thus, when the schedule at the time of operators in service has no space, the print schedule management section 606 allocates the print order information, which can be allocated to the outside of predetermined hours, to operator-absent hours or the like such as nighttime and holidays, and can execute printing processing when specified time arrives. Hence, the printing device when operators are absent such as nighttime can effectively be utilized, and the printing device in business hours that operators are in service can further effectively be utilized.

Further, the print schedule management section 606 can execute an automatic unmanned operation. Thus, a state in which operators are required to carry out services outside service hours and beyond an assumption can be reduced. Further, a condition in which determination whether allocation when operators are absent is possible is automatically executed, print order information allocation when operators are absent is in the range of not exceeding the number of usable sheets and the number of delivered sheets, and others is set. Thus, when the print order information allocation is executed when operators are absent, such determination is automatically executed. Hence, it is not required to carry out work relying on manpower such that operators plan the scheduling of the automatic unmanned operation by determining the contents of the print order information and the capability of the printing device.

Further, the print schedule management section 606 processes the print order information according to the schedule at the time allocated when operators are absent. When errors arise, the print schedule management section 606 refers to the space of the schedule of the next business day. If the errors are limited to the print order information currently processed, this print order information is allotted to the next business day. Also, if the errors are related to the remaining print order information scheduled to the target printer after this print order information, the remaining print order information until the next business day is allotted to the next business day to be temporarily scheduled. If the delivery time of the print order information on the next business day temporarily scheduled is not in time, setting can be made so as to immediately notify the notification destination address of operators which is set beforehand by the notification processing section 613 of the detail of the errors or the like. Thus, since when correspondence on the next day is possible from a schedule point of view, operators are not notified, the load of operators can be reduced in comparison with unconditioned notification when the errors arise in nighttime or the like.

According to the present embodiment, in print sites having a plurality of printers, post-processing machines, and others for processing print orders received from end users, when it is determined that the print order satisfies the delivery time that users desire, also the hand processing by operators is not required and printing outside predetermined hours is possible, the print order can be allocated to the outside of predetermined hours (for example, operator-absent hours, etc.) and the attribute is set to the print order. When the print order schedule at the time of operators in service has no space, since the print order to which the attribute is set can be allocated to the outside of predetermined hours (for example, operator-absent hours such as nighttime and holidays), the printing device when operators are absent such as nighttime can effectively be utilized, and the printing device in business hours that operators are in service can further effectively be utilized.

Further, the print schedule management section executing the automatic unmanned operation can reduce a state in which operators are required to service outside service hours. Furthermore, when the print schedule management section processes the print order receiving according to the schedule with the device at the time allocated to operator-absent hours, in the case of the occurrence of errors (incomplete print data/paper jam/run out of toner/run out of sheet, etc.), the print order in which the errors have arisen is allotted to the next business day to be temporarily scheduled, and the detail of the errors is notified to the notification destination address of operators which is set beforehand. Thus, the load of operators can be reduced in comparison with unconditioned notification when errors arise in nighttime or the like.

Other Exemplary Embodiments, Features and Aspects of the Present Invention

The present invention can also be achieved by supplying a storage medium (or recording medium) storing the program code of software realizing the function of the above-described configuration to a system or an apparatus and reading the program code stored in the storage medium by the computer (CPU or MPU) of the system or the apparatus to execute. In this case, the program code itself which is read from the storage medium realizes the function of the above-described configuration. Thus, the storage medium which stores the program code configures the present invention. Further, the case in which by executing the program code read by the computer, not only the function of the above-described configuration is realized but also an operating system (OS) or the like running on the computer executes a part of or the whole practical processing according to the command of the program code, and with this processing, the function of the above-described configuration can be achieved is also included.

Further, the case in which after the program code read from the storage medium is written into the storage medium provided on a function expansion card which is inserted into the computer or a function expansion unit which is connected to the computer, on the basis of the command of the program cord, the CPU or the like provided on the function expansion card or the function expansion unit executes a part of or the whole practical processing, thus with this processing, the function of the above-described configuration can be achieved is also included.

In addition, the present invention can also be achieved in which the program code of software which realizes the function of the above-described configuration is delivered through a network and stored in the storage unit such as a hard disk and a memory of the system or the apparatus, or the storage medium such as a CD-RW (CD rewritable) and CD-R (CD recordable), and the computer (CPU or MPU) of the system or the apparatus reads the program code stored in the storage unit or the storage medium to execute the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-114689 filed Apr. 12, 2005, which is hereby incorporated by reference herein in its entirety.

What is claimed is:

1. An information processing apparatus configured to communicate with a printer, the apparatus comprising:
   a processor;
   memory;
   a receiving unit configured to receive print data;
   a determination unit configured to determine whether the print data received by the receiving unit can be processed outside predetermined hours;
   a setting unit configured to set an attribute indicating processability outside the predetermined hours to the print data if the determination unit determines that the print data can be processed outside the predetermined hours;
   a selecting unit which is configured to select the print data whose delivery time is later than other print data from within a plurality of pieces of the print data to which the attribute is set by the setting unit if new print data cannot be allocated to the schedule for processing during the predetermined hours;
   a display configured to display a screen to prompt a user of performing a trial print of the data selected by the selecting unit;
   a performing unit configured to perform the trial print of the data selected by the selecting unit after the screen is displayed; and
   a scheduling unit configured to allocate the print data selected by the selecting unit to the schedule outside the predetermined hours in a case where the trial printing does not result in errors, and to cancel the allocation of the print data to the schedule outside the predetermined hours in a case where the trial printing does result in error.

2. The information processing apparatus according to claim 1, wherein the determination unit calculates a quantity of recording material required to execute the print data, and the scheduling unit allocates the print data to the outside of the predetermined hours when the calculated quantity of recording material does not exceed a predetermined quantity.

3. The information processing apparatus according to claim 1, wherein the determination unit detects, from the print data, one of information on necessity of no manual work and information on presence of predetermined days until delivery time of the print data, thereby determining the print data to be processable outside the predetermined hours.

4. The information processing apparatus according to claim 1, wherein the outside of the predetermined hours indicates outside-business hours or operator-absent hours.

5. An information processing method utilized in an information processing apparatus configured to communicate with a printer, the method comprising:
   a receiving step of receiving print data;
   a determination step of determining whether the print data can be processed outside predetermined hours;
   a setting step of setting an attribute indicating processability outside the predetermined hours to the print data if the determination step determines that the print data can be processed outside the predetermined hours;
   a selecting step of selecting the print data whose delivery time is later than other print data from within a plurality of pieces of the print data to which the attribute is set by the setting step if new print data cannot be allocated to the schedule for processing during the predetermined hours;
   a displaying step of displaying a screen to prompt a user of performing a trial print of the data selected by the selecting step;
   a performing step of performing the trial print of the data selected by the selecting step after the screen is displayed; and
   a scheduling step of allocating the print data selected by the selecting step to the schedule outside the predetermined hours in a case where the trial printing does not result in errors, and to cancel allocation of the print data to the schedule outside the predetermined hours in a case where the trial printing does result in error.

6. The information processing method according to claim 5, wherein the determination step includes a step of calculating a quantity of recording material required to execute the print data and allocates the print data to the outside of the predetermined hours when the calculated quantity of recording material does not exceed a predetermined quantity.

7. The information processing method according to claim 5, wherein the determination step includes a step of detecting, from the print data, one of information on necessity of no manual work and information on presence of predetermined days until delivery time of the print data, thereby determining the print data to be processable outside the predetermined hours.

8. The information processing method according to claim 5, wherein the outside of the predetermined hours indicates outside-business hours or operator-absent hours.

9. A non-transitory computer readable storage medium containing computer-executable instructions for controlling an information processing apparatus configured to communicate with a printer, the medium comprising:
   computer-executable instructions for receiving print data;
   computer-executable instructions for determining whether the print data can be processed outside predetermined hours;
   computer-executable instructions for setting an attribute indicating processability outside the predetermined hours to the print data if it is determined that the print data can be processed outside the predetermined hours;
   computer-executable instructions for selecting the print data whose delivery time is later than other print data from within a plurality of pieces of the print data to which the attribute is set by the setting instructions if new print data cannot be allocated to the schedule for processing during the predetermined hours; and
   computer-executable instructions for displaying a screen to prompt a user of performing a trial print of the data selected by the selecting instructions;
   computer-executable instructions for performing the trial print of the data selected by the selecting instructions after the screen is displayed;
   computer-executable instructions for allocating the selected print data to the schedule outside the predetermined hours in a case where the trial printing does not result in errors, and to cancel allocation of the print data to the schedule outside the predetermined hours in a case where the trial printing does result in error.

10. The medium according to claim 9, further including computer-executable instructions for calculating a quantity of recording material required to execute the print order information based on the print data, and allocating the print data to the outside of the predetermined hours when the calculated quantity of recording material does not exceed a predetermined quantity.

11. The medium according to claim 9, further including computer-executable instructions for detecting, from the print data, one of information on necessity of no manual work and information on presence of predetermined days until delivery time of the print order information, thereby determining the print data to be processable outside the predetermined hours.

12. The medium according to claim 9, wherein the outside of the predetermined hours indicates outside-business hours or operator-absent hours.

\* \* \* \* \*